J. G. EBERHART.
Brick Kiln.
No. 165,663.
Patented July 20, 1875.
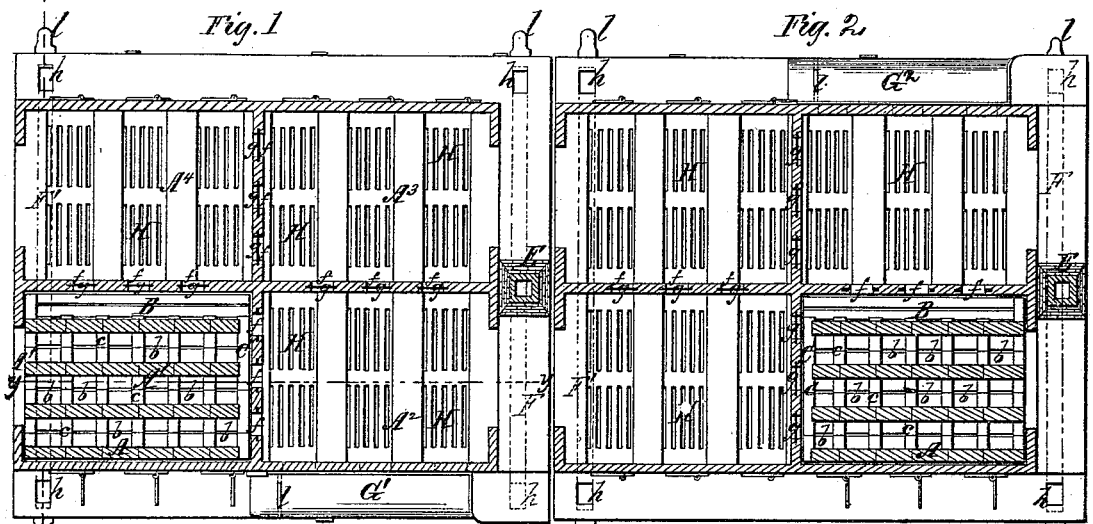
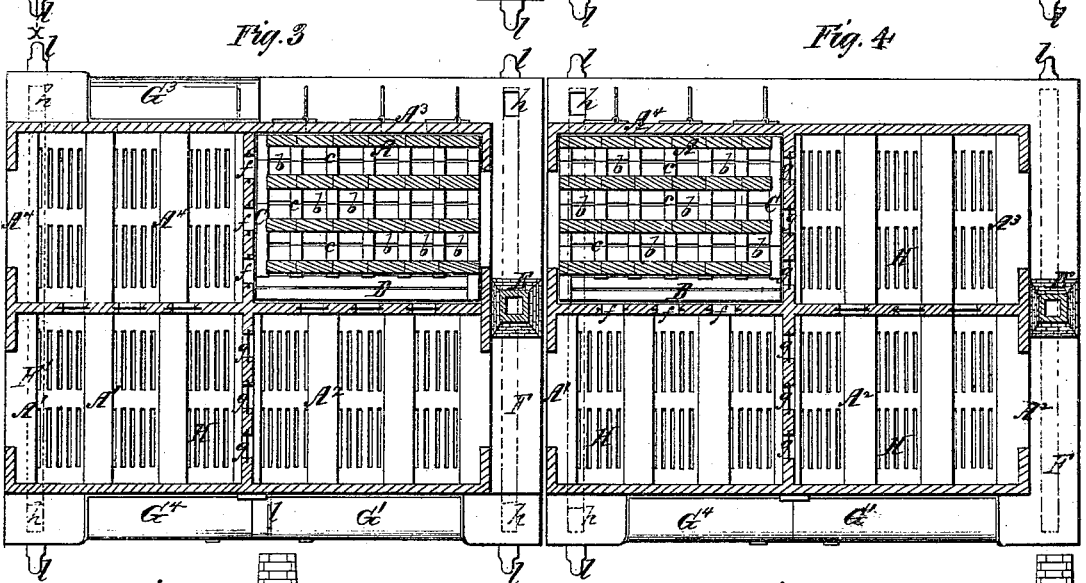
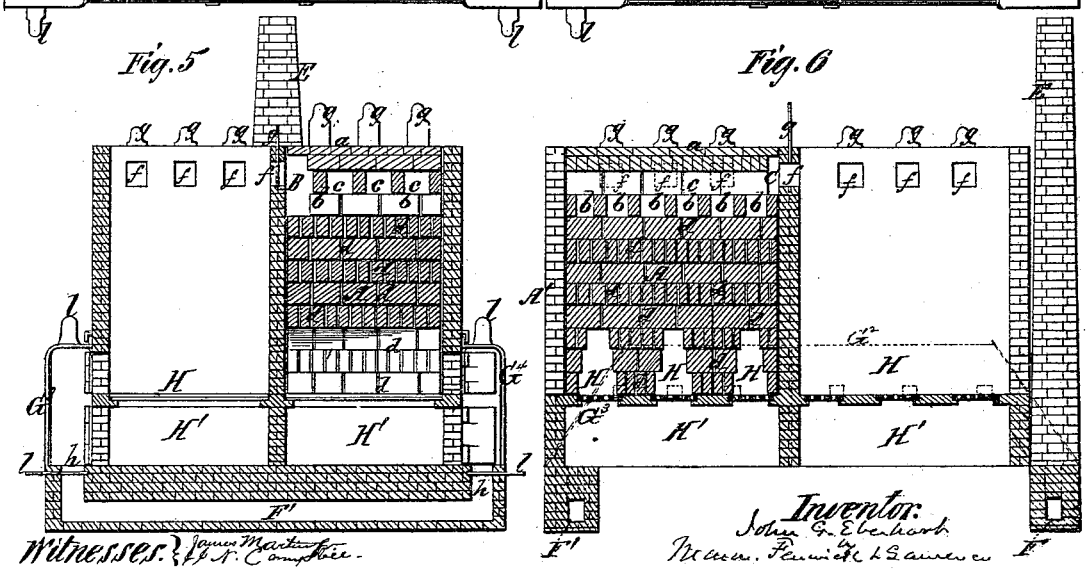

UNITED STATES PATENT OFFICE.

JOHN G. EBERHART, OF BALTIMORE, MARYLAND.

IMPROVEMENT IN BRICK-KILNS.

Specification forming part of Letters Patent No. 165,663, dated July 20, 1875; application filed May 11, 1875.

*To all whom it may concern:*

Be it known that I, JOHN G. EBERHART, of Baltimore, county of Baltimore and State of Maryland, have invented a new and useful Improvement in Brick-Kilns; and I do hereby declare that the following is a full, clear, and exact description thereof, reference being had to the accompanying drawings making part of this specification, in which—

Figures 1, 2, 3, and 4 are horizontal sections of my improved brick-kiln. Fig. 5 is a vertical section in the line $x\ x$ of Fig. 1. Fig. 6 is a section in the line $y\ y$ of Fig. 1.

Similar letters of reference indicate corresponding parts in the several figures.

My present invention is an improvement upon the brick-kiln patented to me July 14, 1874; and the nature of the same consists, first, in topping off the stacks of bricks in a kiln which burns bricks in one chamber and dries them in another simultaneously, and by the flame and heat of one fire, so as to form transverse and horizontal channels at the side and end of a chamber, and transverse and longitudinal draft-passages beneath the top of the stacks of bricks being burnt and dried, whereby the necessity of constructing the kilns with arch flueways is avoided, and thus expense saved; second, it consists in portable hoods, draft-flues, burning-chambers, and a stack or chimney, combined and operating as hereinafter described and specifically claimed, whereby much of the inconvenience or expense in constructing the flues is avoided, and the stack or chimney for a series of kilns can be placed on one side of the series, instead of requiring them to be placed midway between the same.

To enable others skilled in the art to make and use my invention I will proceed to describe it.

Instead of topping off the stack of bricks A to be burned at a point below a regular arch, as in my patent before mentioned, I build up the stack A to the outside flat capping-layer of hard brick $a\ a$, and in the course of building the stack form flue-spaces B and C at one end and one side of a kiln, $A^1$, and also form flue-spaces $b$ and $c$, which run, respectively, across and lengthwise of the stack. All these flues are in communication with the fire-chamber of the kiln by means of interstices $d\ d$ left between the bricks of the stack while building up the stack. The said flue ways and spaces are in such close relation to the communications $f$ between one kiln and another that a free circulation of the smoke or flame which rises to the top of the kiln is secured through said communications when the dampers $g$ are opened. The arches in my patented kiln afford the same facilities for circulation, and there is the same arrangement for the communications and of the dampers in said patented kiln, but the expense is very considerably less for building the kiln shown in my present drawings than that for building my patented kiln, as the former admits of a flat topping off of the stack being adopted, while the patented plan requires regular arches to be built above the stacks of bricks to be burnt.

For maintaining a draft for a kiln which burns bricks on the plan set forth in my aforesaid patented kiln the stack or chimney E is placed at the end of two kilns, $A^2\ A^3$, and directly over and in communication with a transverse ground-flue, F; and another gound-flue, F', is formed at the end of two other kilns, $A^1$ and $A^4$. The ground-flues have passages $h\ h\ h\ h$ through their tops, one at each of the four corners of the square in which the four kilns are built. These passages should have slide-dampers $l$ for closing them when desired. In connection with the flues F and F' and the chimney or stack E, movable hoods $G^1\ G^2\ G^3\ G^4$, for forming connections, as occasion requires, with the combustion-chambers H and draft-chambers H', and the stack or chimney E, are employed as follows: To start kiln $A^1$ place a hood, $G^1$, against kiln $A^2$ opposite the doors of kiln $A^2$, and plug the back end of this hood so as to have kilns $A^1$ and $A^2$ and cross-flue F in communication with the chimney E. To start $A^2$ close dampers between kilns $A^1\ A^2$, plug one end of flue F, and open dampers between kilns $A^2$ and $A^3$, and take a hood, $G^2$, and place it opposite doors of $A^3$, as in Fig. 2, so as to have $A^2$ and $A^3$ in communication with ground-flue F and draft-chimney E. To start kiln $A^3$, close dampers between kilns $A^2$ and $A^3$, and open dampers between kilns $A^3$ and $A^4$, and take the hood $G^2$ from kiln $A^3$, and adjust a hood, $G^3$, opposite doors of kiln $A^4$, and plug the back end of this hood so as to have kilns $A^3$ and $A^4$ in communication with a cross ground-flue, $F'$, and also adjust hoods $G^4$ $G^1$ opposite doors of kilns $A^1$ and $A^2$, so as to have the draft lead from $A^3$ and $A^4$ to the flues $F'$ and $F$ and the draft-chimney E. To start kiln $A^4$, close the dampers between $A^3$ and $A^4$, and start fire in $A^4$, and open dampers between $A^1$ and $A^4$, and adjust hoods $G^4$ and $G^1$ opposite doors of $A^1$ and $A^2$, so as to have the kilns $A^4$ and $A^1$ in communication with ground-flue F and draft-chimney E. During the burning of stack $A^4$ the passage at one end of ground-flue $F'$ is plugged; and in this manner repeat the operation as long as desired.

In practice each of the four kilns shown will be full of bricks when the operation of burning is to be performed, and I have, for convenience, only shown in the different views one kiln filled, as the four views which are drawn for illustrating the operation of the invention indicate the relative positions of the stacks of bricks in the kilns during the burning of the four different kilns.

The hoods are shown high enough to close the draft-doors of the draft-chambers and combustion-chambers, and this being the case the products of combustion may pass to the chimney through the draft-doors of the combustion-chambers; or these products may all pass through the fire-doors into the flues formed by the hoods.

What I claim is—

1. The flueways and flue-spaces B and C and $b$ and $c$, under the flat tops of the brick-kilns, and in the relation to the draft communications $f$ between the several kilns, substantially as and for the purpose described.

2. The portable hood $G^1$, in combination with the ground-flue F, chimney or stack E, and kilns $A^1$ $A^2$, substantially as described.

3. The portable hood $G^2$, in combination with the ground-flue F, chimney or stack E, and kilns $A^2$ and $A^3$, substantially as described.

4. The portable hoods $G^1$, $G^3$, and $G^4$, in combination with the ground-flues F $F'$, kilns $A^3$ $A^4$, and chimney or stack E, substantially as described.

5. The portable hoods $G^4$ and $G^1$, in combination with the ground-flue F, kilns $A^4$ and $A^1$, and chimney or stack E, substantially as described.

JOHN GEO. EBERHART.

Witnesses:
 R. RION LUCAS,
 G. D. JOHNSON.